July 19, 1932.  G. FOTEL  1,867,552
COW TAIL HOLDER
Filed Aug. 21, 1931
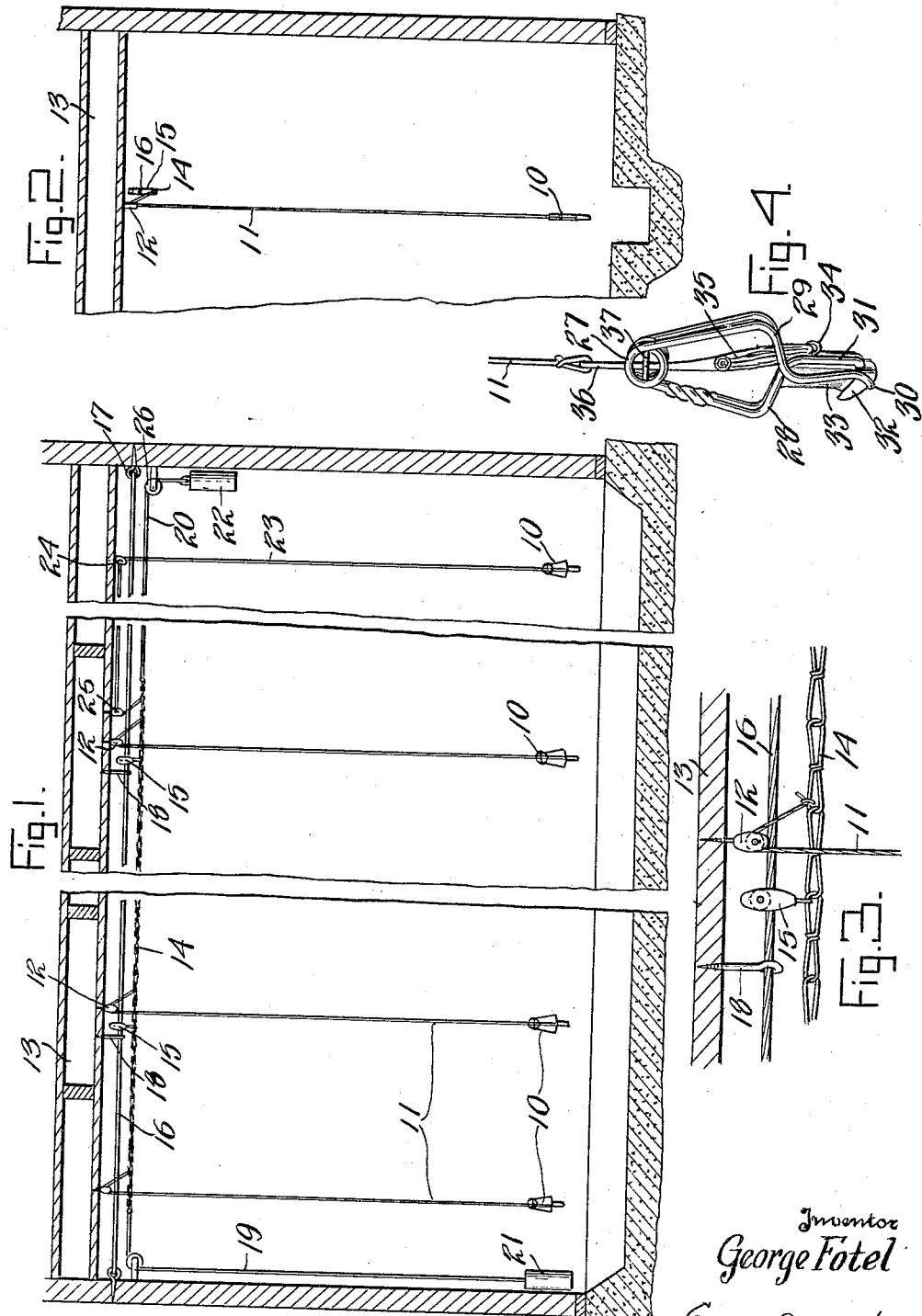
Inventor
George Fotel
By
E.W. Bradford
Attorney Patented July 19, 1932

1,867,552

UNITED STATES PATENT OFFICE

GEORGE FOTEL, OF WATERVILLE, MAINE

COW-TAIL HOLDER

Application filed August 21, 1931. Serial No. 558,540.

This invention has for its object the keeping of the bodies of dairy cows clean and hence for insuring more sanitary conditions under which milking is done. The object is attained by providing means for holding a cow's tail off the ground when she lies down to prevent the tail from getting dirty. If the tail is dirty she soon distributes the dirt over her body as she switches her tail.

The object of the device is to hold the tail off the ground when the cow lies down. Means are also provided which will permit the tail to be automatically released in case the cow should get loose from her stanchion and walk away. The device therefore will not injure the cow.

A further object is to provide a plurality of simple and inexpensive devices all of which may be operated simultaneously and hence quickly.

Referring to the accompanying drawing, which is made a part hereof and on which similar reference characters indicate similar parts, Figure 1 is a view in elevation of the device, Figure 2, a section on line 2—2 of Figure 1, Figure 3, an enlarged detail view, and Figure 4, a further enlarged detail of the clamping device.

In the drawing numeral 10 indicates as a whole a clamping device which is secured to the cow's tail and is attached to a cable 11. This cable passes up over a pulley 12 secured in the ceiling 13 of the barn. The end of the cable 11 is attached in any suitable way to a chain 14. The chain is supported on brackets 15 having rollers which travel on a track 16. The track, which may be and preferably is a metal cable, is secured at its ends to eye screws 17 secured in the walls of the stable. Similar eye screws 18 may be secured at suitable intervals in the ceiling so as to prevent the track from sagging. To the ends of the chain 14 are attached cables 19 and 20 to which weights 21 and 22 are attached. Cables 19 and 20 pass over pulleys 26. The end cable 23 may pass over pulleys 24 and 25 attached to the ceiling and return under the pulley 25 and be attached to the chain 14. The purpose for the different arrangement of the end cable is to permit this cable to be elevated whereas otherwise it could not due to lack of sufficient distance between the point of attachment of the cable to the chain and the pulley 26. The clamp which is secured to the cow's tail is shown in detail in Figure 4. This consists of a spring wire bent to form an eyelet at 27 and having branch arms 28 and 29. The arm 29 preferably has a loop 30 formed at its end and to the end portion 31 of the arm 28 is secured a block 33 which fits in the loop 30. This block preferably has a hook portion 32 which will prevent the cow's tail from too easily slipping off the end of the block. The block 33 is preferably covered by some flexible material such as rubber so as to prevent injury to the cow's tail and moreover to provide friction material which will prevent the device from readily slipping off when in position. The block 33 may be secured to the end portion 31 of the arm 28 by means of a screw 34 having an eyelet. To this eyelet is attached a flexible band 35 to which band is attached a connecting cord 36 and this cord in turn is attached to the lower end of the cable 11. In order to hold the cord 36 centered in the eyelet 27 the cord passes through a washer 37 within the eyelet. This washer may be of any suitable material such as a metal washer or even a flexible leather or rubber washer. While the flexible band 35 here shown is a rubber band, any resilient band such as a coil spring of suitable tension would serve the purpose.

In applying the device to the cow's tail the arms 29 and 28 are pressed inwardly and the tail of the cow is inserted between the loop 30 and the edge of the block 33. The purpose of having a block 33 of course is to provide some contact means other than a sharp edge element such as would result if the wires of the arms 28 and 29 alone were used. If for any reason a cow should get loose in her stall and move away her tail could readily be pulled out of the jaws of the gripping device without injury to her or the device.

From the construction described it will be clear that the cows' tails will all be held off the ground when the cows lie down.

After all the clamps have been detached from the cows' tails they may be raised out of the way so that the cows may pass freely out of the barn without encountering the swinging clamps. It is desirable also to have the clamps out of the way when cleaning out the stalls. This is done by pulling down a weight 22 or lifting up weight 21 whichever is most convenient to the workman.

At milking time it is desirable to raise the cows' tails so that they will switch over the heads of the milkers. This is done by raising the weight 21 part way up. The relative sizes of the weights are such that the weight 22 will substantially balance the weight 21 together with the cables 11 and attached clamps 10.

It will be obvious to those skilled in the art that various changes may be made in my device without departing from the spirit of the invention and therefore I do not limit myself to what is shown in the drawing and described in the specification, but only as indicated by the appended claims.

Having thus fully described my said invention, what I claim as new and desire to secure by Letters Patent, is:

1. A device of the kind described comprising clamps, cables supporting the clamps, a chain to which each of the cables are attached for operating them, said chain having weights on its opposite ends to counterbalance the weight of the clamps and cables, substantially as set forth.

2. A device of the kind described comprising a horizontally supported chain, a track substantially parallel with said chain, a plurality of vertical cables passing over pulleys and attached to said chain, said cables having clamps on their lower ends for engaging the cows' tails, and a pair of weights one on each end of said chain to support the cables in any position to which they are moved, substantially as set forth.

3. In a device for supporting cows' tails in elevated positions, a clamp comprising a wire bent to form a loop at one end and forming an eyelet at the other, one end of the wire having a block attached thereto to serve in cooperation with the said loop to grip a cow's tail, substantially as set forth.

4. In a device for supporting cows' tails in elevated positions, a clamp comprising a wire bent to form a loop at one end and forming an eyelet at the other, one end of the wire having a block attached thereto to serve in cooperation with the said loop to grip a cow's tail, the said block having cushioning material secured thereon, substantially as set forth.

5. In a device for supporting cows' tails in elevated positions, a clamp comprising a wire bent to form a loop at one end and forming an eyelet at the other, one end of the wire having a block attached thereto to serve in cooperation with the said loop to grip a cow's tail, the said block having cushioning material secured thereon, and means for attaching said clamp to a cable, substantially as set forth.

6. In a device for supporting cows' tails in elevated positions, a clamp comprising a wire bent to form a loop at one end and forming an eyelet at the other, one end of the wire having a block attached thereto to serve in cooperation with the said loop to grip a cow's tail, the said block having cushioning material secured thereon, and means for attaching said clamp to a cable, said means including resilient connecting means, substantially as set forth.

In witness whereof, I have hereunto set my hand and seal at Waterville, Maine, this twentieth day of July, A. D. nineteen hundred and thirty-one.

GEORGE FOTEL.